April 15, 1924.

A. F. MASURY ET AL 1,490,575

ANTIRATTLE SECURING DEVICE FOR THE HOODS OF MOTOR VEHICLES

Filed Jan. 7, 1922   2 Sheets-Sheet 1

INVENTORS
Alfred F. Masury
BY August H. Leipert
Redding & Greeley
ATTORNEYS.

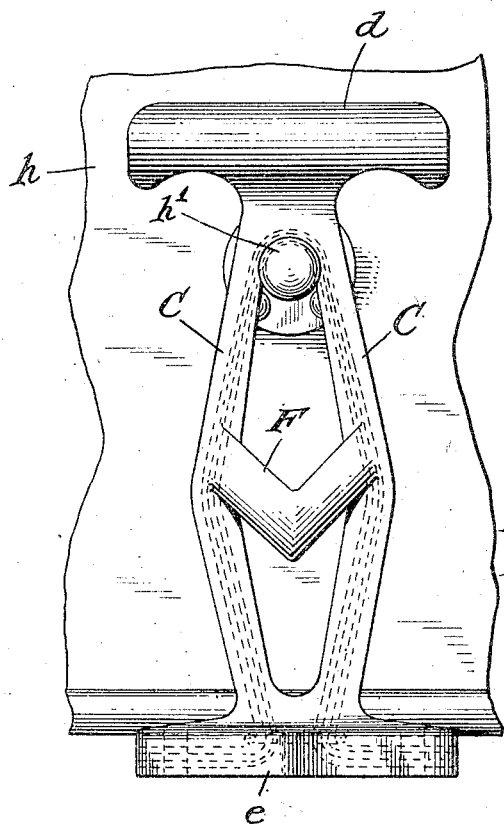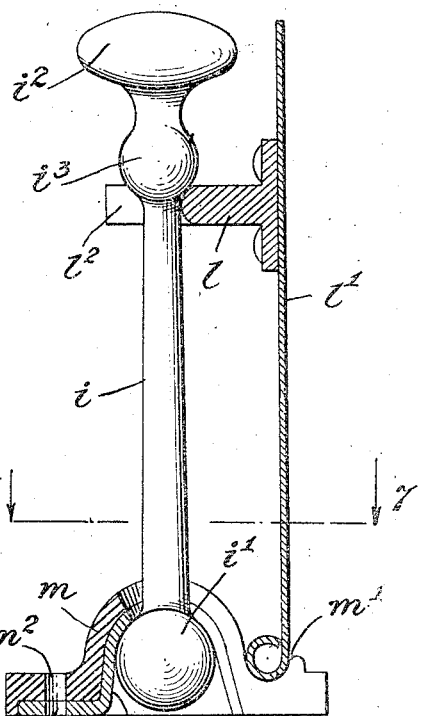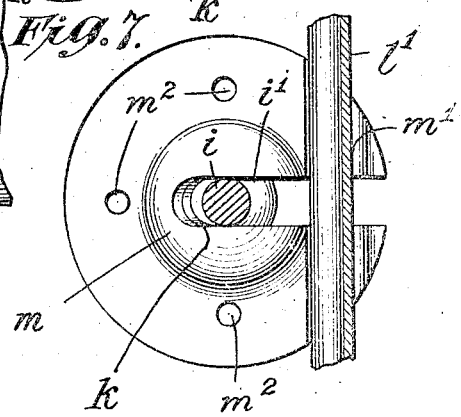

Patented Apr. 15, 1924.                                                          1,490,575

UNITED STATES PATENT OFFICE.

ALFRED F. MASURY AND AUGUST H. LEIPERT, OF NEW YORK, N. Y., ASSIGNORS TO INTERNATIONAL MOTOR COMPANY, OF NEW YORK, N. Y., A CORPORATION OF DELAWARE.

ANTIRATTLE SECURING DEVICE FOR THE HOODS OF MOTOR VEHICLES.

Application filed January 7, 1922. Serial No. 527,693.

*To all whom it may concern:*

Be it known that we, ALFRED F. MASURY and AUGUST H. LEIPERT, citizens of the United States, residing in the borough of Manhattan and in the borough of Queens of the city of New York, in the State of New York, respectively, have invented certain new and useful Improvements in Antirattle Securing Devices for the Hoods of Motor Vehicles, of which the following is a specification, reference being had to the accompanying drawings, forming a part hereof.

This invention relates to an improved yielding nonmetallic securing device for the hoods of motor vehicles whereby the disadvantages of metallic elastic securing devices are overcome. The invention further consists, in connection with the broad objects, of associating with such a non-metallic yielding securing device, a non-metallic rest for the hood to the end that not only are noises eliminated from the securing devices but noises are eliminated in the hood rest. No claim is made to a non-metallic hood rest nor to any particular characteristics of such a rest apart from the combination of a non-metallic hood rest with the improved non-metallic securing devices for the hood.

It is now the common practice in automobile construction to follow the established precedents in the machine art by providing metal throughout and securing metal to metal by means of metal fasteners. In motor vehicles such a relation is especially objectionable because of the tremendous vibrations and shocks to which the vehicle and its parts are subjected and because of the objectionable noise raised by metal to metal connections, the wear on the associated metallic elements with resulting looseness in the connections and the practical impossibility in most situations of providing any degree of lubrication. This condition is found in and about the hoods of motor vehicles, these hoods being of metal, hinged by metal, resting on metal at their edges and secured by metallic fasteners. Vibrations and shocks naturally have a tendency to loosen the hood fastenings and to cause such relative movement therebetween as will result in unpleasant noises and very serious wear. No lubrication can be provided in the metal to metal contact between the edge of the hood and its rest or in the metallic fasteners employed.

It is the general object of the present invention to eliminate the objectionable conditions above indicated by providing a non-metallic fastening device for the hood. In the preferred form, as indicated before, the hood rest will be associated with the retaining devices. More particularly the invention has for its object to provide an improved retaining device for the hood which shall be of yielding material, such as rubber, reinforced by fabric. The invention is not to be limited, however, to the particular material or composition thereof employed to accomplish the desired ends.

In accordance with the invention there is provided a yielding retainer device of any approved form but which, generally speaking, may comprise elastic material anchored to the vehicle frame and having a portion adapted to engage, or be engaged by, a co-operating button, clip or other element formed with or secured to the hood.

Reference is now to be had to the accompanying drawings for a detailed description of specific embodiments of the invention, wherein—

Figure 5 is a view similar to Figure 3 but showing a slightly modified form of retainer.

Figure 6 is a view similar generally to Figure 4 but showing still another form of retainer comprising a single yielding element adapted to be placed under tension.

Figure 7 is a view in horizontal section thereof taken on the plane indicated by the line 7—7 of Figure 6 and looking in the direction of the arrows.

Figure 1:
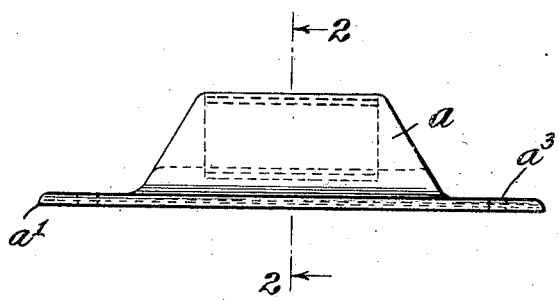
Figure 1 is a view in side elevation of an improved cushioned hood rest constructed in accordance with the invention.
Figure 2:
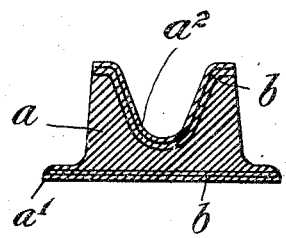
Figure 2 is a sectional view thereof taken along the plane indicated by the line 2—2 of Figure 1 and looking in the direction of the arrows.

The hoods of motor vehicles, no matter what their character, have their edge in contact with the frame or body of the vehicle at some points and while a nonmetallic strip may be placed between the hood and its point of rest, a cushioned rest as such has never been provided. By a cushioned rest is meant one which is non-metallic and somewhat yielding and adapted to absorb vibrations and shocks and prevent noise and rattling without the employment of a lubricant. In Figures 1 and 2 there is illustrated a suitable embodiment of a cushioned rest by itself made in accordance with the invention. As there shown, the block $a$ is molded of suitable material, as rubber, with a broad base $a'$ and a channeled surface, as indicated at $a^2$, with inclined side walls to guide the edge of the bonnet home and embrace it slightly. The material thus molded may have therein fabric cords or other reinforcement, as indicated at $b$, some of this preferably traversing the base $a'$ and other of it lying along the channeled surface $a^2$. The improved rest may be secured to the frame, body, or other portion of the vehicle, by any approved means and is illustrated as provided with holes $a^3$ through which may pass screws or the like. A hood having its edge resting within the channel $a^2$ is held entirely out of contact with metal and is seated firmly since it may be drawn firmly into engagement with the rest compressing the latter to a degree, if necessary, in making the connection. Shocks and vibrations are absorbed by the yielding material of the rest and the problem of lubrication is eliminated since there is no metal to metal contact.

Figure 3:
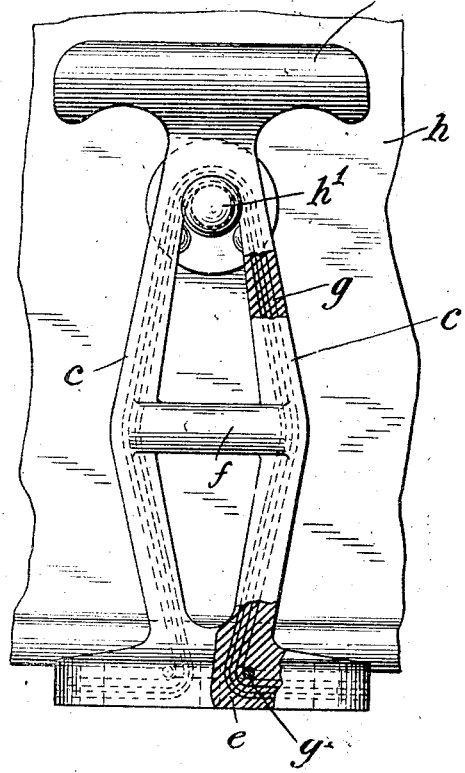
Figure 3 is a view in elevation looking at the side of a hood and showing an improved retaining device therefor.
Figure 4:
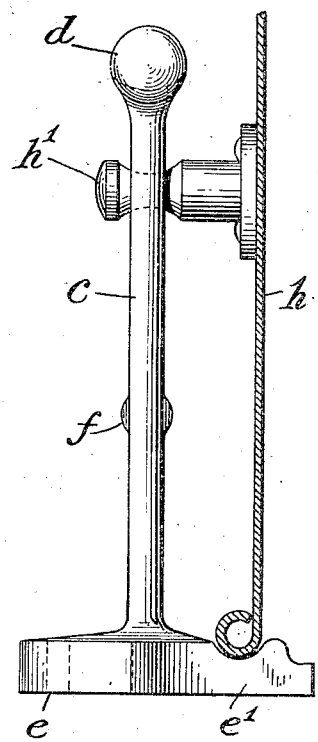
Figure 4 is a view in end elevation of the retaining device shown in Figure 3, the hood being indicated in section.

As shown in Figures 3 and 4 anti-rattle retaining devices for the hood are provided and these may be employed in combination with or independently of a non-metallic yielding hood rest embodying the feature of the invention first described. The retaining device illustrated is shown as composed of a plurality of retaining strips $c$ spaced apart but connected at their upper ends with a hand-hold $d$. In the preferred form it is proposed to make the spaced strips $c$ of yielding material, such as rubber, and to mold them in one piece with the hand-hold $d$ and with a suitable base $e$. The strips are held in spaced relationship by means of a resilient compression stop $f$ which, likewise, is preferably formed of rubber, so as to yieldingly resist longitudinal pull on the spaced strips $c$, which pull would naturally tend to straighten these strips and bring them together. It will be evident that the strips $c$ might be unyielding, while the compression stop $f$ therebetween is of yielding character and the desired results secured, but it is believed to be better practise for manufacturing considerations and conditions of use to mold the stop $f$ in one piece with the strips $c$. These strips $c$ being separated by the compression stop $f$ are angularly disposed adjacent their mid-sections so that longitudinal pull thereon will tend to straighten them out against the yielding resistance offered by the compression stop $f$. Some reinforcement of the strip $c$ might be provided by molding therein cords $g$ of fabric or the like, which would be of unyielding character. These cords, as illustrated, extend around the base $e$ and afford considerable reinforcement to it as well. Where these cords converge in the base $e$ of the angularly disposed strips $c$, they may be further reinforced by an unyielding cord $g'$ which resists their tendency to spread. The hood $h$ may carry thereon any suitable type of fastening device for co-operation with the improved yielding retainer, such a device being indicated as a button $h'$ over which the separated strips $c$ may be hooked. It will be understood that in any constructions where co-operating elements are provided on two relatively movable parts the elements may be reversed on the parts. From the description given, the action of the yielding retainer should be clear. When the hood is in position for clamping the hand-hold $d$ will be grasped and a longitudinal pull transmitted therethrough to the strips $c$ which will tend to straighten out and come together. This tendency will be resisted yieldingly by the compression stop $f$ although sufficient longitudinal movement of the strips $c$ will be afforded in spite of this stop, to enable the strips to be engaged with the button $h'$. The stop $f$, under compression, however, will always tend to spread the strips $c$ and thereby accelerate a yielding pull on the button $h'$ by the engagement therewith of the strips $c$. Movement of the hood is thereby yieldingly prevented.

Where desired, the two anti-rattle elements above described may be brought into combination and this will usually be advantageous. As shown in Figures 3 and 4, a yielding rest $e'$ of the general character described with reference to Figures 1 and 2 may be molded integral with the base $e$ for the yielding retainer. In such case, when the hood $h$ has its edge drawn into engagement with the compressible rest $e'$ by the yielding pull on the button transmitted by the strips $c$ there will be a mutual interaction and co-operation of the two elements which will positively eliminate rattles and hold the hood yieldingly against movements and vibrations in both directions, any such movements and vibrations being absorbed by the yielding elements engaged with it.

The construction shown in Figure 5 is similar generally to that shown in Figure 3, the only difference being in the character of the stop F, which in Figure 3 is straight and resists stresses at every point by compression, whereas in the device shown in Figure 5 the stop F does not extend straight between the strips C but is molded in one piece with two angular sections. Any pull impressed on the strips C will, nevertheless, be resisted by the yielding stop F but one side of this stop will be placed under compression while the other side will be placed under tension, as will be evident.

In Figures 6 and 7 a somewhat different embodiment of a yielding retaining device embodying the invention is illustrated. Here, the retainer is made up as a single rod $i$ of yielding material, such as rubber, which is intended to be placed under tension when the hood is fastened down. To this end, the yielding pull rod $i$ may be molded with an enlarged end $i'$ which may be anchored by a metallic seat $k$, free swiveling movement between the two elements being provided for conveniently by making the metallic seat $k$ of spherical form as well as the enlarged end $i'$ of the pull rod. The upper end of the pull rod $i$ may have molded therewith a hand-hold $i^2$ by which the pull rod may be elongated against the action of the yielding material and engaged with a clip $l$ carried with the hood $l'$. The invention is not concerned with the character of the clip $l$ nor with the construction of the yielding retainer by which engagement between the hood and the retainer may be effected since obviously such considerations involve only matters of design. By way of illustration, Figure 6 shows a clip $l$ as having a forked end $l'$ into which the pull rod $i$ may be drawn and over which may rest an enlargement $i^3$ molded in the pull rod $i$. The different application of the improved principle which Figure 6 is intended to illustrate primarily is the employment of a tension device as opposed to the compression stop illustrated in Figure 3 for holding the hood yieldingly against movement.

A yielding rest will be associated with the type of retainer shown in Figure 6 by molding a rest $m$ of non-metallic yielding material, such as rubber, directly on the metal anchorage $k$ and shaping it, and providing a channel $m'$ in which the lower edge of the hood $l'$ may rest. The holes $m^2$, $k'$ in the yielding rest and in the metal anchorage may be provided in alinement to receive securing devices, such as screws, for the rest.

It has been sought to indicate during the course of the description those matters which have to do with design and it will be understood that any changes of such character are to be deemed within the scope of the invention provided the principle is employed.

We claim as our invention:

1. A securing device for the hood of a motor vehicle including an elastic non-metallic element adapted to engage the hood and resist yieldingly movement thereof.

2. A retaining device for the hood of a motor vehicle including a non-metallic pull strip adapted to be secured to a part of the vehicle and means carried with the hood to be engaged by the pull strip, said pull strip being held elastically in engagement with said means.

3. A non-metallic securing device for the hood of a motor vehicle including a rubber element adapted to engage the hood and resist yieldingly movement thereof.

4. Anti-rattle securing devices for the hood of a motor vehicle including in combination a non-metallic retaining strip engaging the hood elastically and a non-metallic rest on which the lower edge of the hood seats.

5. Anti-rattle securing devices for the hood of a motor vehicle including a non-metallic retaining strip engaging the hood elastically and a non-metallic rest for the hood moulded integral with said retaining strip.

6. A retaining device for the hood of a motor vehicle including two pull strips adapted to engage the hood and a yielding compression element interposed between the strips and adapted to spread them laterally to maintain them elastically in engagement with the hood.

This specification signed this 5th day of January, A. D. 1922.

ALFRED F. MASURY.
AUGUST H. LEIPERT